May 25, 1943.   E. H. KOCHER   2,320,140
LUBRICATION
Filed Aug. 3, 1940   2 Sheets-Sheet 1
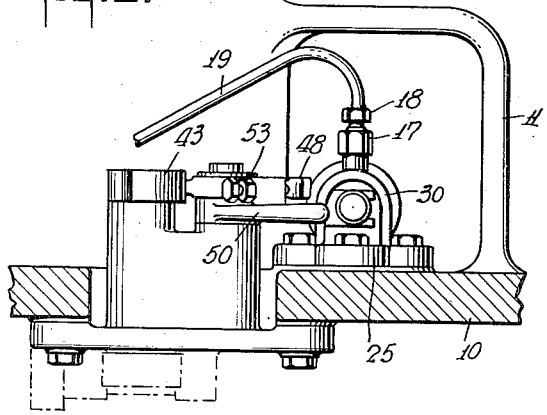
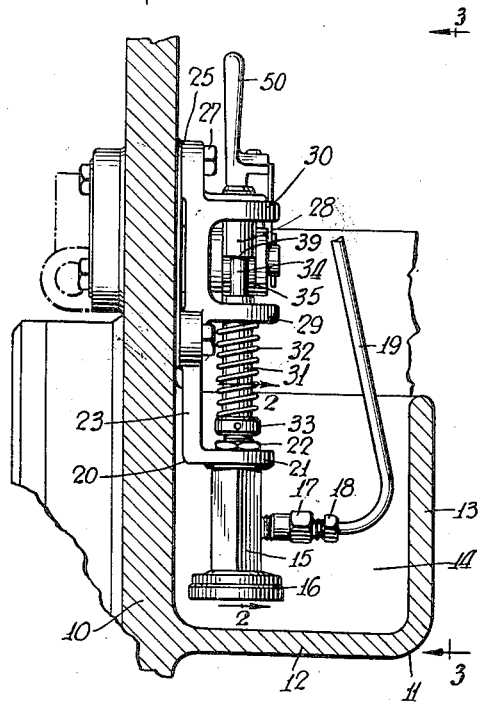
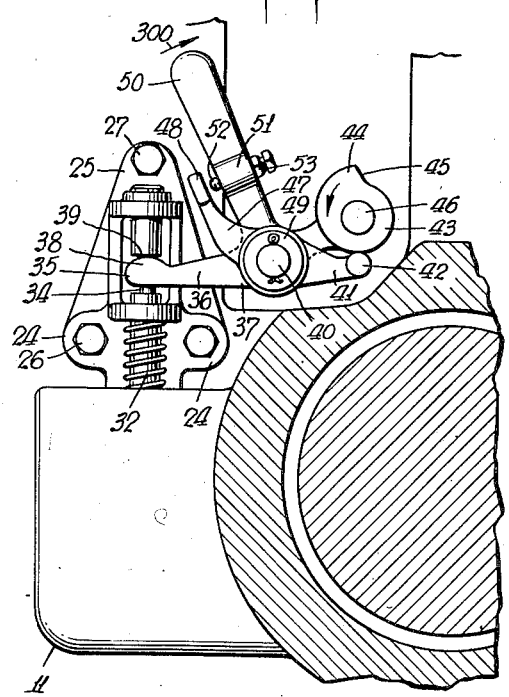
INVENTOR
Edward H. Kocher
BY
ATTORNEYS May 25, 1943.  E. H. KOCHER  2,320,140
LUBRICATION
Filed Aug. 3, 1940   2 Sheets-Sheet 2
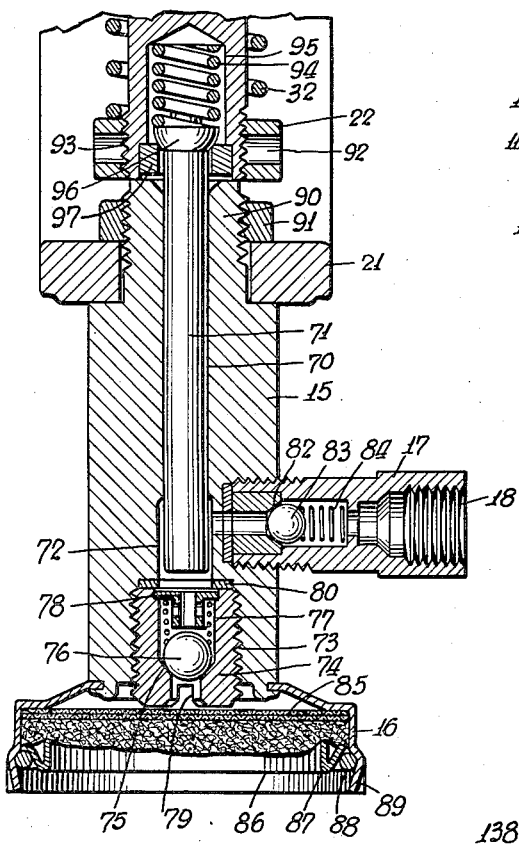
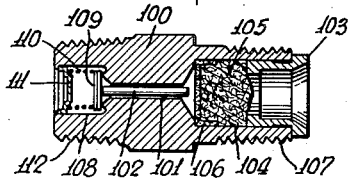
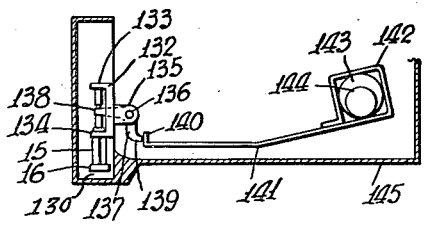
INVENTOR
*Edward H. Kocher*
BY
ATTORNEYS Patented May 25, 1943

2,320,140

UNITED STATES PATENT OFFICE 2,320,140

LUBRICATION

Edward H. Kocher, Boonton, N. J., assignor to Auto Research Corporation, a corporation of Delaware Application August 3, 1940, Serial No. 350,649

2 Claims. (Cl. 184—27)

The present invention relates to lubricated machine tool construction.

It is among the objects of the present invention to provide a machine tool construction which will have interiorly built therein an automatic lubricated installation and which will supply the bearings of such machine tool with relatively minute yet accurately proportioned quantities of lubricant during the operation of the mechanism without attention from the operator, and which at the same time will enable the operator at intervals, when desired, to feed lubricant manually to the bearings through the same lubricant distributing system.

Another object is to provide a lubricating installation for a machine tool which may be readily assembled with the mechanism to be lubricated in recesses and openings readily available in and about the mechanism without substantially changing the construction thereof and without interfering with the operation or appearance of such mechanism.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention, to utilize a recess or reservoir in and about the mechanism to be lubricated as a reservoir and at the same time to place in such recess an elongated unpacked plunger pump which will be supported by a bracket carrying bearing for the connecting rod of said pump, and also permitting ready actuation by automatic and manual actuating means.

This pump will supply a tubing system feeding the bearings of the mechanism to be lubricated.

In the drawings which show one of the various possible embodiments which may be constructed according to the present invention, but to which the invention should not be restricted, since this embodiment is merely illustrative, Fig. 1 is a transverse side sectional view of the pump assembly mounted upon a machine mechanism with the pump being shown in side elevation;

Fig. 2 is a transverse longitudinal sectional view upon the line 2—2 of Fig. 1, through the pump construction upon an enlarged scale as compared to Fig. 1;

Fig. 3 is a side elevational view upon the line 3—3 of Fig. 1;

Fig. 4 is a top plan view thereof partly in section;

Fig. 5 is a longitudinal sectional view through one type of flow metering outlet fitting which may be utilized in connection with the lubricating system of Figs. 1 to 4; and Fig. 6 is a diagrammatic side view illustrating an alternative method of operating the lubricating pump of Figs. 1 and 2.

Referring to Fig. 1, the machine body 10 is provided with a cup 11 having the bottom wall 12 and the side wall 13 and projecting outwardly from the body of the machine 10.

The cup 11 receives the lubricant in its cavity 14 to be supplied to the bearing. The pump structure 15 has a cup-shaped inlet filter 16 and a ball check outlet 17 submerged below the oil in cup 11.

The bracket 20 which has a base 23 that is bolted by the ears 24 and 25 and the bolts 26 and 27 to the body 10 of the machine tool to be lubricated has a foot 21 which carries the pump 15 to which it is clamped by the nut 22.

The construction of the pump 15 and the strainer unit 16 are best shown upon Fig. 2. As indicated in Fig. 2, the body of the pump 15 is provided with a bore 70 which receives the elongated unpacked piston plunger 71. The plunger projects down to an enlarged chamber 72 which serves as a pump inlet and discharge chamber.

The lower portion of the body is provided with a tapped socket 73 which receives the inlet ball check sleeve 74 having the valve seat 75 against which the ball check 76 is pressed by the spring 77.

The ball check sleeve 74 carries the spring retainer 78 and it has the fillister slot 79 enabling it to be screwed into position against the gasket 80.

The outlet ball check comprises a body 17 including the valve seat 82 against which is pressed the ball check 83 by the spring 84.

The outlet is provided with a coupling connection 18 to the tubing 19, as also shown in Fig. 1. The cup shaped strainer enclosure 16 is provided with the backing screens 85, the felt pad 86 and the retainer rings 87 and 88. The ends of the cup are indented at 89 to retain said ring 88 in position.

As shown in Fig. 2, the reduced threaded portion 90 of the pump body 15 is drawn up on the leg 21 of the bracket 20 by the nut 91.

The spring 94 which is received in the socket 95 in the lower end of connecting rod 28, acts upon the mushroom enlargement 96 at the top of the plunger 71 to press the convex face thereof against the retainer ring 97. The nut 22 is provided with the openings 92 through which the thread 93 at the lower end of the connecting rod 28 may be deformed to lock the nut 22 in position. The pump as shown in Fig. 2, is in the position that it takes when it has substantially completed its discharge stroke.

The pump will feed a distributing system to lubricate the mechanism as indicated in Figs. 1, 3 and 4, with the flow from the outlets being controlled by the flow metering fittings 100 each of which has a central bore 101 and a pin 102 substantially completely filling said bore and forming an annular crevice of the order of one to several thousandths of an inch, which form a substantially higher obstructing effect to the flow of lubricant than is encountered in the conduit system or in the bearings.

The fitting is provided with a sleeve 103 fitting into inlet socket 104 which socket contains the strainer 105, backed up by the wire cup 106. The machine thread 107 enables ready attachment to a tubing coupling connection.

The outlet socket 108 receives the check valve 109 which is spring closed, as indicated by the spring 110. Spring 110 presses against the valve retainer 111. The outlet end of the body 100 is provided with the pipe thread 112 enabling it to be screwed into a junction in the machine to be lubricated.

The connecting rod 28 has bearings in the legs 29 and 30 projecting outwardly above the base 23 of the bracket. The portion 31 of the connecting rod between the legs 21 and 29 is encircled by a coil spring 32 which reacts against the leg 29 at its upper end and against the nut 22 at its lower end.

The pump may be operated either automatically or manually. For this purpose a pair of bell crank levers 37 and 41 are mounted in side by side relation upon a shaft 40. The lower arm 41 of the first bell crank lever has a follower 42 riding upon a cam 43 fixed upon rotary shaft 46 of the machine, said cam having a lobe 44 and a shoulder 45. The other arm 47 of said bell crank lever has an operating end 48 adapted to contact the end of screw 52 in a lateral enlargement 51 of an operating handle 50 which constitutes the upper arm of the bell crank lever 37, the lower arm of which has clevis jaws 35 that straddle connecting rod 28 at the portion 34 thereof of reduced diameter and which is located between bracket legs 29 and 30.

The contact position of the adjustment screw 52 may be varied to regulate the lost motion before contact between the contact face 48 and the screw 52 when the cam lobe 44 actuates the lever 41. When said lost motion is taken up and there is contact at 48—52, the arm 47 will then reciprocate the connecting rod 28 through the lever arms 36.

In normal operation, the cam 43 driven by the shaft 46 will cause reciprocation of the lever combinations 41—47 and 36—50 and discharge from the pump 15 into the pipe 19 and thence to the bearings past the flow restriction metering fittings of Fig. 5.

Where it is desired to test the system however, or to feed excess quantities of lubricant therein, the lever 50 may be manually actuated in direction 300 to lift the connecting rod against the spring 32 and cause the pump to be repeatedly discharged.

In Fig. 6 the reservoir 130 may be positioned on the side of a mechanism and it has a well from which the inlet filter 16 and pump 15 of the same construction as in Fig. 2 draws lubricant.

The bracket 132 has inwardly projecting legs 133 forming a bearing for the connecting rod and 134 carrying the pump body in the same manner as described in connection with Fig. 2. The base of the bracket 132 has the rearwardly projecting ears 135 forming a pivotal mounting for the lever 137 which at its end 138 operates the pump and at its other end 139 is actuated by the heel 140 of the bent rod or lever 141.

The rod or lever 141 has a cage 142 which encloses the eccentric 143 driven by the shaft 144 of the mechanism diagrammatically indicated at 145. In the structure indicated, the pump 15 will be caused to take one stroke upon each complete revolution of the shaft 144 of the machine.

It will be understood that many changes could be made in the particular features as shown, and many apparently widely different embodiments of this invention could be made without departing from the scope of the claims. It is intended that all matter contained in the above description or shown in the accompanying drawings shall be interpreted as illustrative and not in a limiting sense.

What is claimed is:

1. A pump unit comprising a bracket having three legs extending therefrom, a pump cylinder unit clamped to one of said legs and having a piston therein, a connecting rod jointed to and aligned with said piston, said connecting rod extending through the other two legs of said bracket, operating means intervening between said other two legs and having a clevis connection to said connecting rod for operating said pump, a stop on the lower end of said connecting rod and a coiled spring encircling the same, reacting at one end against the intermediate leg and at the other end against said stop, to urge the piston to discharge position.

2. In apparatus of the character described, a pump unit including a bracket affixed with respect to the mechanism to be lubricated, a pump cylinder affixed to the lower end of said bracket, a source of lubricant in which said cylinder is submerged, said bracket having a pair of parallel spaced legs above said pump cylinder, a piston reciprocal in said cylinder, a connecting rod having a movable connection with the upper end of said piston and having a bearing mount in said legs of the bracket, a pump operating mounting shaft laterally of said bracket, a bell crank lever on said shaft, a cam shaft on the machine for operating said bell crank lever and a second bell crank lever on said shaft having an arm in the path of movement of one arm of said first bell crank lever, the second bell crank lever having an arm affording a clevis connection with respect to said connecting rod for operating the latter, said second bell crank lever constituting a handle for manual operation of the pump independently of the mechanical operation thereof.

EDWARD H. KOCHER.